US008685349B2

(12) United States Patent
Bristow et al.

(10) Patent No.: US 8,685,349 B2
(45) Date of Patent: *Apr. 1, 2014

(54) EXTRACTION OF URANIUM FROM WET-PROCESS PHOSPHORIC ACID

(75) Inventors: Nicholas Warwick Bristow, Wilson WA (AU); Mark S. Chalmers, Littlehampton (AU); James Andrew Davidson, Wattyl Park (AU); Bryn Llywelyn Jones, Oakbank (AU); Paul Robert Kucera, Valrico, FL (US); Nick Lynn, Englewood, CO (US); Peter Douglas Macintosh, Peppermint Grove (AU); Jessica Mary Page, North Adelaide (AU); Thomas Charles Pool, Golden, CO (US); Marcus Worsley Richardson, Goodwood (AU); Karin Helene Soldenhoff, Earlwood (AU); Kelvin John Taylor, West Leederville (AU); Colin Wayrauch, Brandon, FL (US)

(73) Assignee: Urtek, LLC, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/555,469

(22) Filed: Jul. 23, 2012

(65) Prior Publication Data

US 2013/0022520 A1 Jan. 24, 2013

Related U.S. Application Data

(63) Continuation of application No. 12/510,294, filed on Jul. 28, 2009, now Pat. No. 8,226,910.

(60) Provisional application No. 61/085,177, filed on Jul. 31, 2008, provisional application No. 61/161,133, filed on Mar. 18, 2009.

(51) Int. Cl.
*C01G 17/00* (2006.01)

(52) U.S. Cl.
USPC .......... 423/3; 423/6; 423/8; 423/11; 423/143; 423/321.1

(58) Field of Classification Search
USPC ............... 423/3, 6–11, 143, 321.1, 321.2; 210/649–655, 660–665
See application file for complete search history.

(56) References Cited

U.S. PATENT DOCUMENTS

| | | | |
|---|---|---|---|
| 2,743,154 A | 4/1956 | Kaufman et al. | |
| 2,756,123 A | 7/1956 | Bailes et al. | |
| 2,767,045 A | 10/1956 | McCullough | |
| 2,768,059 A | 10/1956 | Bailes et al. | |
| 2,789,879 A | 4/1957 | Kaufman | |
| 2,859,092 A | 11/1958 | Bailes et al. | |
| 2,882,123 A | 4/1959 | Long | |
| 2,770,520 A | 11/1959 | Long et al. | |
| 3,044,855 A | 7/1962 | Young | |
| 3,157,462 A | 11/1964 | Hendrickson | |
| 3,576,601 A | 4/1971 | Cochran | |
| 3,711,591 A | 1/1973 | Hurst et al. | |
| 3,770,612 A | 11/1973 | Gray et al. | |
| 3,869,536 A | 3/1975 | James | |
| 3,880,980 A | 4/1975 | Wamser | |
| 3,975,178 A * | 8/1976 | McCullough et al. ............ 71/34 |
| 4,105,741 A | 8/1978 | WieWiorowski et al. | |
| 4,110,422 A | 8/1978 | Hill | |
| 4,118,457 A | 10/1978 | Seko | |
| 4,152,402 A | 5/1979 | Walters, Jr. et al. | |
| 4,180,545 A * | 12/1979 | McCullough et al. ............ 423/8 |
| 4,199,470 A | 4/1980 | Yasuda et al. | |
| 4,206,049 A * | 6/1980 | Stana et al. ................... 210/652 |
| 4,225,396 A | 9/1980 | Graham et al. | |
| 4,236,911 A | 12/1980 | McCullough | |
| 4,258,013 A | 3/1981 | Pyrih et al. | |
| 4,279,705 A | 7/1981 | Riggs, Jr. | |
| 4,280,904 A | 7/1981 | Carlson | |
| 4,280,985 A | 7/1981 | Yan | |
| 4,284,606 A | 8/1981 | Rendell et al. | |
| 4,301,122 A | 11/1981 | Johnson | |
| 4,305,912 A | 12/1981 | Pyrih et al. | |
| 4,316,800 A | 2/1982 | Stana et al. | |
| 4,325,918 A | 4/1982 | Luke et al. | |

(Continued)

FOREIGN PATENT DOCUMENTS

| | | |
|---|---|---|
| EP | 0067583 | 12/1982 |
| IT | 1230853 | 11/1991 |

(Continued)

OTHER PUBLICATIONS

International Search Report and Written Opinion of Jan. 24, 2013 for PCT/US2012/62711.

(Continued)

*Primary Examiner* — Steven Bos
(74) *Attorney, Agent, or Firm* — Allen, Dyer et al

(57) ABSTRACT

A process for the extraction of uranium compounds from wet-process phosphoric acid includes lowering the iron concentration of the wet-process phosphoric acid and reducing the valency of any remaining ferric iron in the wet-process phosphoric acid to ferrous iron, and then extracting uranium compounds from the wet-process phosphoric acid. The process can include separating a side stream from a feed stream of wet-process phosphoric acid, wherein the side stream has a greater concentration of the uranium compounds than the feed stream by filtration. Extracting uranium compounds from the wet-process phosphoric acid can be by ion exchange process or by solvent extraction.

19 Claims, 6 Drawing Sheets

(56) References Cited

U.S. PATENT DOCUMENTS

| | | | |
|---|---|---|---|
| 4,341,602 A | 7/1982 | Nenner et al. | |
| 4,356,154 A | 10/1982 | Lopez et al. | |
| 4,371,505 A | 2/1983 | Pautrot | |
| 4,402,917 A | 9/1983 | Largman et al. | |
| RE31,456 E | 12/1983 | Carlson | |
| 4,427,640 A | 1/1984 | Bowerman et al. | |
| 4,438,077 A | 3/1984 | Tsui | |
| 4,461,746 A * | 7/1984 | Bierman et al. | 423/8 |
| 4,485,078 A * | 11/1984 | Weston et al. | 423/320 |
| 4,578,249 A | 3/1986 | Srinivasan et al. | |
| 4,599,221 A | 7/1986 | Ketzinel et al. | |
| 4,606,894 A | 8/1986 | Kunin et al. | |
| 4,748,008 A | 5/1988 | Takeda | |
| 4,781,905 A * | 11/1988 | Yu-Ming et al. | 423/321.2 |
| 4,968,504 A | 11/1990 | Rourke | |
| 5,130,001 A | 7/1992 | Snyder et al. | |
| 5,437,848 A | 8/1995 | Hard | |
| 5,489,616 A | 2/1996 | Park et al. | |
| 5,573,738 A | 11/1996 | Ma et al. | |
| 5,787,322 A | 7/1998 | Black et al. | |
| 5,885,465 A | 3/1999 | Bray et al. | |
| 6,303,090 B1 | 10/2001 | Rothman et al. | |
| 7,294,271 B1 | 11/2007 | Huffman et al. | |
| 7,655,199 B2 | 2/2010 | Cable et al. | |
| 7,959,812 B2 | 6/2011 | Theoleyre et al. | |
| 8,226,910 B2 * | 7/2012 | Bristow et al. | 423/3 |
| 2003/0113247 A1 | 6/2003 | Singh et al. | |
| 2009/0022638 A1 | 1/2009 | Rossoni et al. | |
| 2009/0032403 A1 | 2/2009 | Malhotra | |
| 2010/0028226 A1 | 2/2010 | Bristow et al. | |
| 2011/0024704 A1 | 2/2011 | Soderquist et al. | |

FOREIGN PATENT DOCUMENTS

| | | |
|---|---|---|
| JP | 58-009823 | 1/1983 |
| KR | 10-1987-0002187 | 12/1987 |
| KR | 10-1989000-3974 | 10/1989 |

OTHER PUBLICATIONS

International Search Report from PCT/US2012/62711 dated Jan. 24, 2013.

PCT Search Report of PCT/US2009/051886.

Office Action of Feb. 20, 2013 for co-pending U.S. Appl. No. 13/555,606.

Response to Office Action of Feb. 20, 2013 for co-pending U.S. Appl. No. 13/555,606.

* cited by examiner

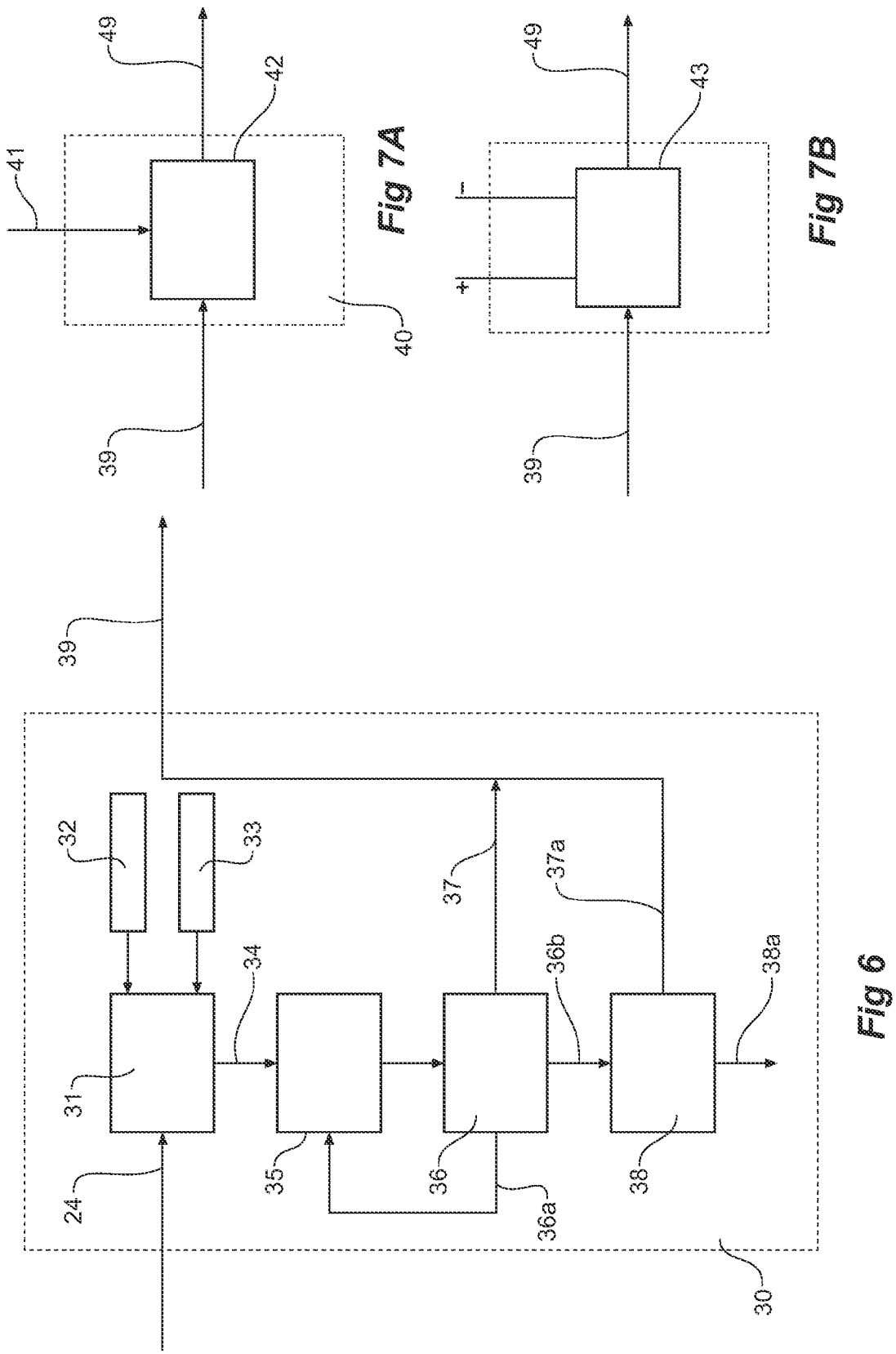

EXTRACTION OF URANIUM FROM WET-PROCESS PHOSPHORIC ACID

CROSS-REFERENCE TO RELATED APPLICATIONS

This is a continuation of U.S. application Ser. No. 12/510,294, filed Jul. 28, 2009 titled "Extraction of Uranium From Wet-Process Phosphoric Acid," which claims the benefit of U.S. Provisional Application No. 61/085,177, filed Jul. 31, 2008, and U.S. Provisional Application No. 61/161,133, filed Mar. 18, 2009, the disclosures of which are hereby incorporated by reference herein in their entireties.

FIELD OF INVENTION

This invention generally relates to extraction of valuable minerals and more particularly to the extraction of uranium from wet-process phosphoric acid.

BACKGROUND OF THE INVENTION

There are a number of significant phosphate deposits from which is produced phosphate for chemical feed and fertilizers. These phosphate deposits can contain potentially economic quantities of uranium. For instance, phosphate rock is mined and processed in Florida (and other plants in the US) to produce a variety of high value agricultural products. The phosphate rock contains uranium in low quantities (for example, 100-200 ppm of uranium may be present in phosphate rock depending on the source of the phosphate rock). During the acid digestion stage of the wet-process phosphoric acid (WPA) process this uranium is solubilized into the phosphoric acid, which is further processed to manufacture the products of the plants.

Phosphoric acid producers have previously recovered uranium from WPA prior to production of fertilizer products using a variety of solvent extraction (SX) processes and these technologies are well understood in industry. Several plants operated over the years and one plant operated until the late 1990's. All plants were closed down due to high operating costs and the long term depressed uranium market.

With the recent revival of the uranium market there is renewed interest in the recovery of uranium from WPA. However, there is resistance to simply revert back to the historical processes for a number of reasons:

Historical high operating cost: The SX circuits operated in the past have had operating costs that were in the $3^{rd}$ and $4^{th}$ quartile of uranium producers, despite years of research and incremental operational improvements.

Operational difficulties: The SX circuits had numerous operational and maintainability issues that attributed to the high operating cost, but also led to downtime affecting production rates.

Decreasing ore quality: Over the past 20 years the quality of phosphate resources has been decreasing, i.e., a reduction in phosphate content and an increase in deleterious components. In particular the addition of metallic iron, which may be required for the processing of uranium, has become a more important issue due to increased iron levels in the ore, and subsequently in the WPA.

Waste management: The historical process produced a significant amount of radioactive solid waste that requires disposal. In the past, this waste has been co-disposed with the gypsum with limited regulatory issues; however, because of regulatory changes this co-disposal is no longer viable, and now the ability to economically dispose of any radioactive solid waste produced is uncertain. It can however, be safely assumed that the disposal of radioactive solid waste will be an expensive and difficult exercise.

Volatile uranium prices: The uranium price has risen dramatically in the past 2 years from historical lows to peak around US$135/lb. The long term predictions for the uranium price vary dramatically. This instability leads to a project operating in the $3^{rd}$ or $4^{th}$ quartile of production being very high risk, as the WPA uranium production plants have been in the past.

Thus, there is a need for a process for the extraction of uranium from wet-process phosphoric acid that will overcome at least some of these difficulties and provide a useful alternative to the industry.

SUMMARY OF INVENTION

In one form therefore, although this may not be the only or broadest form, the invention may comprise a process for the extraction of uranium compounds from wet-process phosphoric acid. In one form the invention comprises a process for the extraction of uranium compounds from wet-process phosphoric acid (WPA), wherein the process may comprise reducing the iron content of the WPA, reducing the valency of any remaining iron in the WPA, and extracting uranium compounds from the WPA.

The process may further include separating from the WPA a side stream having a greater concentration of the uranium compounds than the WPA, wherein the process may comprise passing the WPA through a filter membrane to produce a clean WPA permeate and a retentate as the side stream, the retentate comprising a greater concentration of the uranium compounds than the concentration of uranium in the permeate.

One embodiment for reducing the iron content of the WPA may comprise precipitating the iron as an iron ammonium phosphate compound. Precipitating the iron as an iron ammonium phosphate compound may comprise adding ammonia, forming a precipitate and separating the precipitate from the WPA. Precipitating the iron as an iron ammonium phosphate compound may further comprise increasing the redox potential of the WPA to approximately 500 mV (as measured against an Ag/AgCl/saturated KCl reference electrode) before adding the ammonia. Increasing the redox potential of the WPA to approximately 500 mV can comprise adding at least one of air, oxygen and peroxide to ensure conversion of ferrous iron to ferric iron.

Reducing the valency of iron in the WPA may comprise reducing ferric iron to ferrous iron.

One method of reducing the ferric iron to ferrous iron may comprise contacting the WPA with a compound selected from one or more of the group comprising, a ferro-phosphorous compound, a ferro-silicon compound and metallic iron. Alternatively reducing the ferric iron to ferrous iron may comprise electro-reduction in an electrolytic cell. An electrolytic cell is selected from a group comprising a sandwiched anode/cathode/anode arrangement, stainless steel cathodes in various configurations, including moving electrodes such as drum, pump, reciprocating, semi-permeable membrane between electrodes, porous packed coke electrode beds and flow-through cells.

Extracting uranium compounds may comprise an ion exchange process. The ion exchange process may comprise passing the WPA through a multi-stage chelating ion exchange column system and eluting the ion exchange column system.

Alternatively extracting uranium compounds may comprise a solvent extraction process for the extraction of the uranium from the iron reduced WPA stream. Prior to the extraction process the WPA may be further oxidized using air/oxygen mixture, but may involve the use of chemical oxidants, such as hydrogen peroxide. The solvent extraction process can comprise a multi stage solvent extraction system.

The filter membrane may be selected from an ultra-filtration or a nano-filtration membrane or combination thereof and comprising a pore size in the range of from 10 to 1,000 Å.

In an alternate form, the invention may comprise a process for the extraction of uranium compounds from wet-process phosphoric acid (WPA), the process may comprise including reducing the iron content of the WPA, reducing the valency of iron in the WPA and extracting uranium compounds from the WPA, wherein the reducing the iron content of the WPA may comprise precipitating the iron as an iron ammonium phosphate compound, reducing the valency of iron in the WPA which itself may comprise reducing ferric iron to ferrous iron by contacting the WPA a compound selected from one or more of the group comprising, a ferro-phosphorous compound, a ferro-silicon compound and metallic iron, and extracting uranium compounds which may comprise an ion exchange process comprising passing the WPA through a multi-stage chelating ion exchange column system and eluting the ion exchange column system.

Eluting the multi-stage ion exchange column system may comprise a process water rinse, removal rinse with an ammonia solution, elution with ammonium carbonate complex to form an uranium rich ammonium carbonate complex eluate, and removal of uranium oxide concentrate from the ammonium carbonate complex eluate.

Extracting uranium compounds from the WPA may further comprise concentrating the uranium rich ammonium carbonate complex eluate in a second anionic ion exchange process before removal of uranium oxide concentrate from the ammonium carbonate complex eluate.

The second ion exchange process may comprise passing the eluate from the primary ion exchange process through a multi stage ion exchange system and eluting the multi stage ion exchange system.

Eluting the secondary multi stage ion exchange system may comprise a water rinse, elution with 1M sodium carbonate, and rinsing.

Removal of uranium from the sodium carbonate complex secondary eluate may comprise acidification of the eluate, precipitation of uranyl peroxide via the addition of hydrogen peroxide, separating the precipitate from the supernatant fluid, and drying of the uranium peroxide precipitate by heating to remove free and combined water.

Alternatively, removal of uranium from the primary ion exchange ammonium carbonate complex eluate may be selected from the group comprising acidification of the eluate and precipitation with hydrogen peroxide, acidification of the eluate and precipitation with ammonia, precipitation of sodium diuranate from the eluate by caustic addition, re-dissolution in sulphuric acid and precipitation with hydrogen peroxide, and precipitation of ammonium diuranate from the eluate by ammonia addition, re-dissolution in sulphuric acid and precipitation with ammonia.

In an alternative form, the invention may comprise a process of reducing the iron content of a WPA stream comprising precipitating the iron as an iron ammonium phosphate compound by adding ammonia, forming a precipitate and separating the precipitate from the WPA.

In another alternative form, the invention may comprise a process for separating from a stream of wet-process phosphoric acid a side stream having a greater concentration of the uranium compounds than the stream of wet-process phosphoric acid; the process comprising passing the wet-process phosphoric acid through a filter membrane to produce a clean wet-process phosphoric acid permeate and a retentate as the side stream, the retentate comprising a greater concentration of the uranium compounds than the concentration of uranium in the permeate.

In yet another alternative form, the invention may comprise a process for the extraction of uranium compounds from WPA, wherein the process may comprise reducing the valency of iron in the WPA, and extracting uranium compounds from the WPA.

In an alternative form, the invention may comprise a process for the extraction of uranium compounds from WPA, the process comprising lowering the iron content of the WPA, separating from WPA a side stream having a greater concentration of the uranium compounds than the stream of wet-process phosphoric acid, reducing the valency of any remaining iron in the side stream, and extracting uranium compounds from the side stream.

In an alternative form, the invention may comprise a process of reducing the valency of iron in a WPA stream by reducing ferric iron to ferrous iron, the process comprising one or more of the group comprising contacting the WPA with metallic iron, electro-reduction in an electrolytic cell, and the addition of ferro-phosphorus alloy.

In an alternative form, the invention comprises a process for the extraction of uranium compounds from wet-process phosphoric acid, wherein the process may comprise separating from a stream of wet-process phosphoric acid, the side stream having a greater concentration of the uranium compounds than the stream of wet-process phosphoric acid, lowering the iron content of the side stream, reducing the valency of any remaining iron in the side stream, and extracting uranium compounds from the side stream.

In an alternative form, the invention comprises a process for the extraction of uranium compounds from wet-process phosphoric acid (WPA), wherein the process may comprise lowering the iron content of the WPA, and extracting uranium compounds from the WPA, wherein reducing the iron content of the WPA comprises precipitating the iron as an iron ammonium phosphate compound, and the extracting uranium compounds comprises a solvent extraction process comprising oxidizing the WPA and then a multi stage solvent extraction system.

BRIEF DESCRIPTION OF THE DRAWINGS

This then generally describes the invention but to assist with understanding, reference will now be made to embodiments of the invention with the assistance of the accompanying drawings in which:

FIG. 6 illustrates a more detailed flow diagram of the iron removal part of the process of one or more embodiments;

FIGS. 7A and 7B illustrate more detailed flow options for valency reduction part of the process of one or more embodiments;

DETAILED DESCRIPTION OF THE PREFERRED EMBODIMENTS

The present invention will now be described more fully hereinafter with reference to the accompanying drawings, in which embodiments of the invention are shown. This invention may, however, be embodied in many different forms and should not be construed as limited to the embodiments set forth herein. Rather, the embodiments herein presented are provided so that this disclosure will be thorough and complete, and will fully convey the scope of the invention to those skilled in the art.

Figure 1:
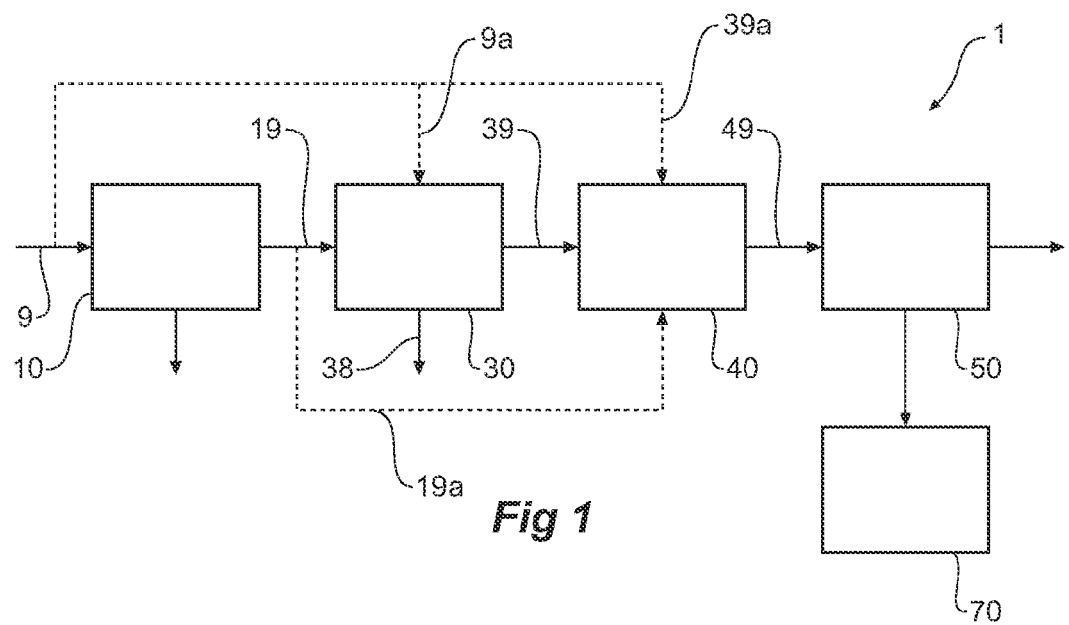
FIG. 1 illustrates a general flow diagram of a process according to a one embodiment of the invention.

Now looking more closely at the drawings and more particularly at FIG. 1, by way of example, it will be seen that one embodiment of a process 1 for extracting uranium from a stream of wet-process phosphoric acid (WPA) feed 9 comprises a first stage 10 in which the is WPA clarified. Depending upon the quality of the feed in a particular plant this stage is optional. In the next stage the WPA has an optional iron removal process 30. If used, the iron removal process 30 may be accomplished by precipitation of iron as an iron ammonium phosphate compound 38. Decreasing the iron concentration in the side stream can improve the economics of the subsequent process of chemically reducing the remaining ferric iron to the ferrous state as well as interference with ion exchange purification.

The WPA with the iron removed or if the optional iron removal process 30 is not used the WPA 19 is transferred directly to a valency reduction stage 40 where any remaining iron is reduced from the ferric state to the ferrous state. It is believed that ferrous ions will not bind to the ion exchange resins described herein at the same level as do ferric ions leading to greater binding of uranium compounds to the ion exchange resin.

The valency reduced side stream 49, now containing little ferric iron, is transferred to an ion exchange process 50 in which uranium compounds are removed from the side stream and the uranium depleted WPA.

The removal of uranium from the ion exchange resins is accomplished by elution and subsequent treatment in stage 70 as is discussed in more detail below.

If clarification is not required then the WPA 9 is transferred directly to iron removal 30 via line 9a. If neither clarification nor iron removal is required then the WPA 9 is transferred directly to valency reduction 30 via lines 9a and 39a. If clarification 10 is required but iron removal is not required then clarified WPA 19 is transferred directly to valency reduction 40 via line 19a.

Each of the stages clarification 10, iron removal 30, valency reduction 40, ion exchange 50 and subsequent treatment 70 will be discussed in more detail below.

Figure 2:
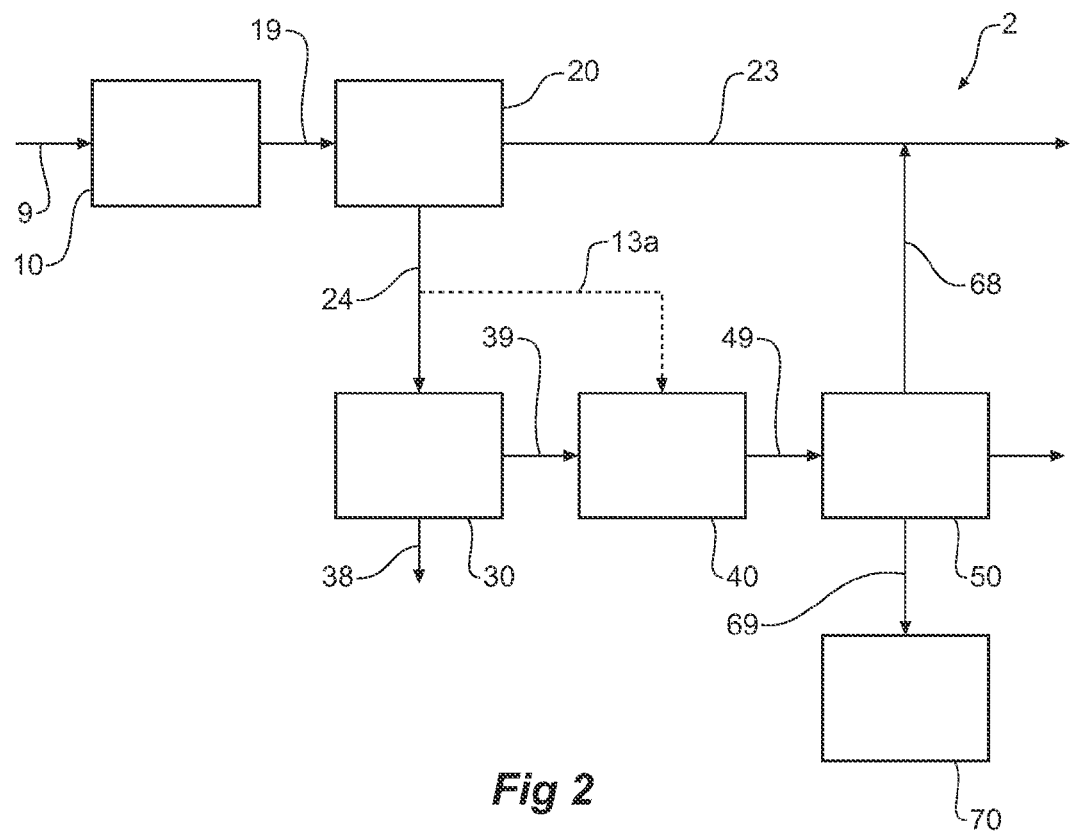
FIG. 2 illustrates a general flow diagram of a process according to an alternative embodiment of the invention.

FIG. 2 illustrates an alternative embodiment of a process 2 for extracting uranium from a stream of wet-process phosphoric acid feed 9. It comprises a first stage 10 in which the WPA clarified. Depending upon the quality of the feed in a particular plant this stage is optional. In a next first stage 20 the clarified WPA 19 is separated by a membrane filter into a retentate side stream 24 and a permeate flow 23. The pore size of the filter membrane is selected to give a greater proportion of uranium compounds in the retentate side stream 24 than in the permeate flow 23. The filter can have a membrane with a pore size in the range of from 10 to 1,000 Å.

It is believed that in the membrane filtration stage the uranium is retained in a complex which is of such a size that it does not pass through the pores of the filter.

The side stream 24 next has an optional iron removal process 30. If used, the iron removal process may be accomplished by precipitation of iron as an iron ammonium phosphate compound 38. Decreasing the iron concentration in the side stream can improve the economics of the subsequent process of chemically reducing the remaining ferric iron to the ferrous state as well as interference with ion exchange purification.

The iron reduced WPA 39 is transferred a valency reduction stage 40 where any remaining iron is reduced from the ferric state to the ferrous state. It is believed that ferrous ions will not bind to the ion exchange resins described herein at the same level as do ferric ions leading to greater binding of uranium compounds to the ion exchange resin.

The valency reduced side stream 49, now containing little ferric iron, is transferred to an ion exchange process 50 in which uranium compounds 59 are removed from the side stream and the uranium depleted side stream 58 is returned to the permeate 12 of the membrane stage 20.

The removal of uranium from the ion exchange resins is accomplished by elution and subsequent treatment stage 70 as is discussed in more detail below.

Each of the stages clarification 10, filtration 20, iron removal 30, valency reduction 40, ion exchange 50 and subsequent treatment 70 will be discussed in more detail below.

Figure 3:
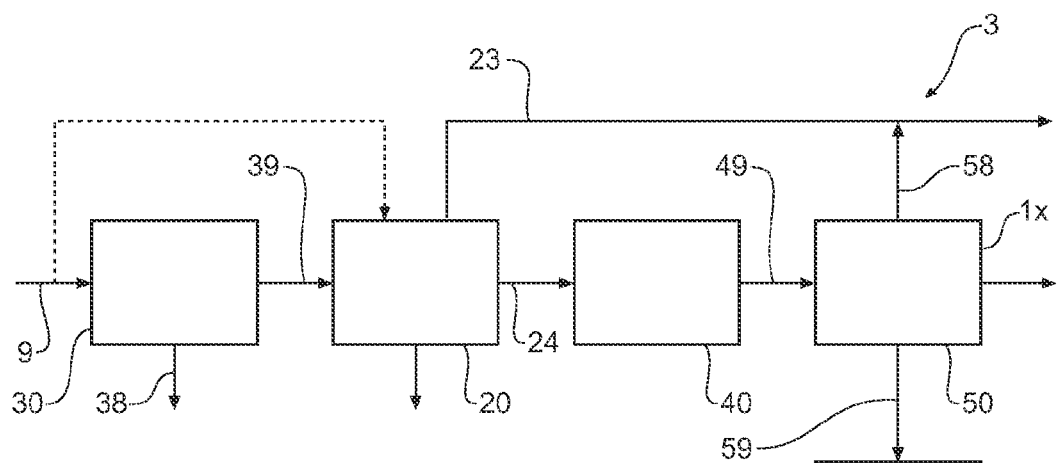
FIG. 3 illustrates a general flow diagram of a process according to an alternative embodiment of the invention.

FIG. 3 illustrates a further alternative embodiment of a process 3 for extracting uranium from a stream of wet-process phosphoric acid feed 9. A first stage comprises a iron removal process 30. In the iron removal process precipitation of iron as an iron ammonium phosphate compound 38 is used to remove iron. Decreasing the iron concentration in the side stream can improve the economics of the subsequent process of chemically reducing the remaining ferric iron to the ferrous state as well as interference with ion exchange purification.

In a next stage 20 the iron reduced WPA 39 is separated by a membrane filter into a retentate side stream 24 and a permeate flow 23. The pore size of the filter membrane is selected to give a greater proportion of uranium compounds in the retentate side stream 24 than in the permeate flow 23. The filter can have a membrane with a pore size in the range of from 10 to 1,000 Å. Filtration at this stage is believed to be advantageous because besides increasing the concentration of the uranium compounds it can also remove fine precipitated gypsum and ferrosilicates which may cause problems downstream in the process.

The iron reduced retentate 24 is transferred a valency reduction stage 40 where any remaining iron is reduced from the ferric state to the ferrous state. It is believed that ferrous ions will not bind to the ion exchange resins described herein at the same level as do ferric ions leading to greater binding of uranium compounds to the ion exchange resin.

The valency reduced side stream 49, now containing little ferric iron, is transferred to an ion exchange process 50 in which uranium compounds 59 are removed from the side stream and the uranium depleted side stream 58 is returned to the permeate 12 of the membrane stage 20.

The removal of uranium from the ion exchange resins is accomplished by elution and subsequent treatment stage 70 as is discussed in more detail below.

Each of the stages filtration 20, iron removal 30, valency reduction 40, ion exchange 50 and subsequent treatment 70 will be discussed in more detail below.

Each of the stages clarification 10, filtration 20, iron removal 30 and valency reduction 40 in general are optional depending upon the quality and grade of the feed wet-process phosphoric acid and the required processes for treatment of the WPA for supply to the stages of ion exchange 50 and subsequent treatment 70 in which the uranium is removed and concentrated.

Each of the stages clarification 10, filtration 20, iron removal 30 and valency reduction 40, ion exchange 50 and subsequent treatment 70 will be discussed separately and as discussed above can be used in various combinations.

Figure 4:
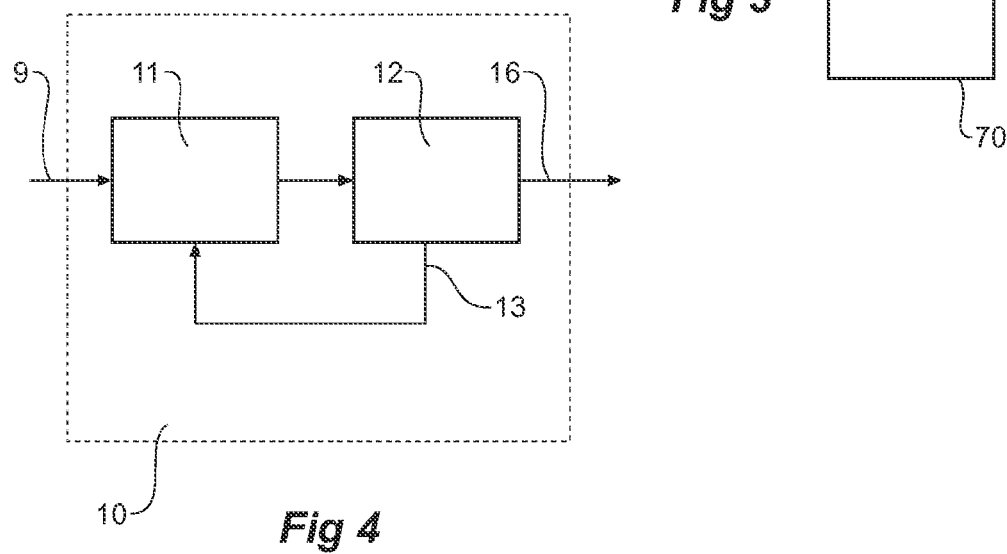
FIG. 4 illustrates a more detailed flow diagram of the clarification part of the process of one or more embodiments.

In the clarification stage 10 as shown in FIG. 4 the WPA is cleaned. Plant feed 9, at a concentration of approximately 30% WPA is likely to contain a significant amount of suspended solids, mostly sodium fluorosilicates and gypsum, which may cause issues for later stages of the process. In the clarification stage 10 there may be an existing clarifier 11 in a WPA plant and additional clarifiers 12, complementing the pre-existing clarifiers, are used to reduce the total suspended solids (TSS) and decrease process fluctuations due to upstream changes. One such fluctuation may result from regular maintenance activities on the existing clarification circuit. In this embodiment, WPA can, for instance, be clarified in conventional clarifiers. The clarifiers are dosed with flocculant to encourage precipitation of suspended solids. Underflow from the clarifier 12 is transferred back to the clarifier 11 with the overflow 16 from the additional clarifier 12 being transferred to the next stage of the process.

Figure 5:
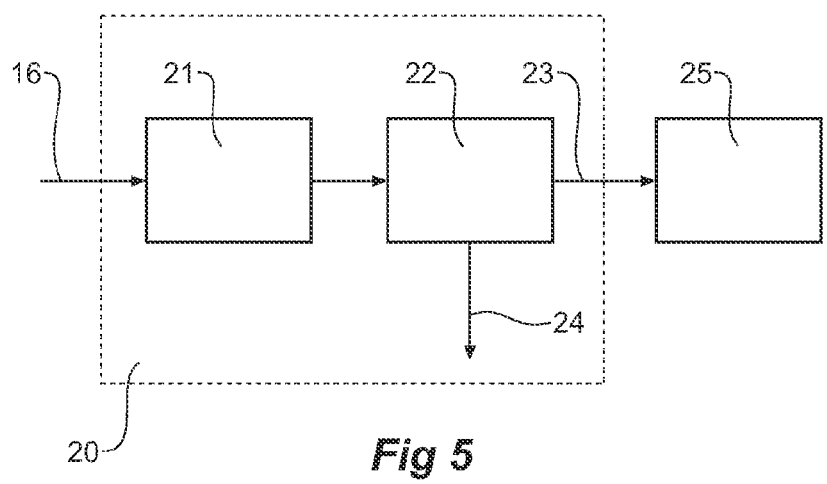
FIG. 5 illustrates a more detailed flow diagram of the membrane treatment part of the process of one or more embodiments.

In the filtration stage 20 as shown in FIG. 5, membrane separation is applied with the aim of producing a retentate for feed to the uranium extraction process that is higher in uranium concentration than the original WPA feed. It is also desirable to reduce the volume of WPA to be treated in subsequent stages of the uranium extraction process.

Enriched uranium content and lower volume of WPA to be treated will aid ion exchange loading rates and can reduce the volume of ion exchange resin required in the extraction.

WPA from the clarifier overflow 16 (for instance) is pre-filtered 21 before the pressure is boosted for separation in filter 22 containing ultrafiltration (UF) membrane elements. Alternatively a nano-filtration membrane may be used or any combination of these membrane types in either a series or parallel configuration. The filter can have a membrane with a pore size in the range of from 10 to 1,000 Å. The volumetric recovery target for the filter 22 is preferably about 50%. Permeate 23 from the membrane plant is transferred to WPA holding tanks 25 for further use in the fertilizer production process. Retentate 24 from the filter 22 is the portion of the WPA used for the uranium extraction from the filtration stage 20 and is passed to (for instance) the iron removal stage 30.

In the iron removal stage 30 as shown in FIG. 6, the aim is to lower the iron content. The mechanism of this embodiment of the invention is to remove the majority of the total iron present through precipitation of an iron ammonium phosphate (IAP) compound from the retentate 24 of the membrane filtration stage 20 or from the clarification stage 10.

The ion exchange (IX) resin proposed for the extraction of uranium has a high affinity to load ferric iron, which inhibits uranium loading, hence, if IX is to be used effectively the iron in WPA solution reporting to IX must be presented in the ferrous state. The IAP precipitation section of the plant is designed to remove a portion of the ferric iron, as a partial step prior to reporting to the valency reduction (VR) circuit.

Additionally IAP precipitation reduces scaling species (fluorosilicate and gypsum) in the iron reduced WPA reporting to the IX circuit, dramatically improving operability of the fixed bed IX operation. IAP is formed by the following reactions:

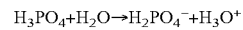

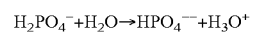

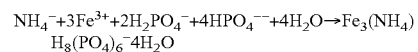

Retentate 24 from the filtration stage 30 or WPA from the clarification stage 10 is transferred to a small pre-mix tank 31, where one or more of air, oxygen or peroxide 32 can be added in sufficient quantities to increase the redox potential of retentate 24 to approximately 500 mV (as measured against an Ag/AgCl/saturated KCl reference electrode) ensuring complete oxidation of ferrous to ferric iron. Alternatively, no oxidant may be added. Ammonia 33 is also added at this point at a stoichiometric excess of approximately 300-1000% of the calculated ammonia requirements for formation of IAP. From the pre-mix tank 31, the treated stream 34 is transferred to overflow reactors 35. The treated stream 34 has a total residence time of 7 to 12 hours in the overflow reactors 35 to allow completion of the IAP precipitation process. The overflow from the overflow reactor 35 is transferred to a centrifuge, or other solid liquid separation device 36, where IAP is separated from the WPA. The clarified liquor 37 (low solid concentration) is transferred to the iron valency reduction stage 40. The majority of the solids discharged from the centrifuge 36 are returned via line 36a to the overflow reactors 35 to maintain a solids density of 25-50 wt. % in the reactor.

The remaining solids 36b discharged from the centrifuge 36 are transferred to a belt filter 38 where additional clarified liquor is removed from the cake and forwarded to the valency reduction stage 40, via line 37a. Solids 38a comprising mostly IAP are removed.

The purpose of the valency reduction stage 40 is to ensure that all of the iron presented to the ion exchange stage is reduced to ferrous iron as ferric iron loads preferentially to uranium on the ion exchange resin reducing potential uranium loading.

By way of example, options for valency reduction include:
Addition of metallic iron
Addition of ferro-phosphorus alloy
Addition of ferro-silicon alloy
Electroreduction (ER).

Various options for valency reduction are shown in FIGS. 7A to 7B.

Addition of metallic iron is shown in FIG. 7A. Metallic iron 41 can be added to reactor 42 in order to reduce the remainder of the ferric iron to ferrous iron. This can add an additional load of dissolved iron impurity to the entire process. For example, concentrate may be pumped into three agitated tanks with a total residence time of three hours. Powdered or granular iron is added into the first of two reactors at 120% stoichiometric equivalent (relative to the amount of ferric iron). The reaction with the ferric iron is:

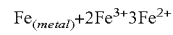

However, an undesired side reaction is the dissolution of the metallic iron in the WPA to form additional ferrous iron and hydrogen.

As indicated above the metallic iron could be substituted with or used in combination with ferro-phosphorus alloy or ferro-silicon alloy.

Electroreduction (ER) is shown in FIG. 7B.

ER uses electrical energy to reduce the WPA. Advantages include:
  No chemical species are added to the WPA;
  Easy control of electrolytic reduction; and
  Reduction can be brought virtually to completion.

In one form of the electroreduction stage feed 39 is transferred to the continuously operated ER cells 43 consisting of a flow through porous cathode where reduction of ferric to ferrous takes place. Coke used for the electrodes can be replaced weekly or when needed. The ER may be operated at 10 V, current density of 180 A/m$^2$ with an assumed current efficiency of 75%. Reduced WPA is transferred to the ion exchange extraction process 50 via line 49.

Design options for the ER process include by way of example:
  Sandwiched Anode|Cathode|Anode arrangement;
  Stainless steel cathodes in various configurations, including moving electrodes such as drum, pump, reciprocating, etc.;
  Semi-permeable membrane between electrodes;
  Porous packed coke (or other carbonaceous material such as granular graphite) electrode beds; and
  Flow-through orientation.

Hydrogen and toxic hydrides may be generated at the cathode and can be dealt with as required. Absorbers and/or scrubbers can be used to collect toxic hydrides. These can be disposed of according to the relevant requirements.

Figure 8:
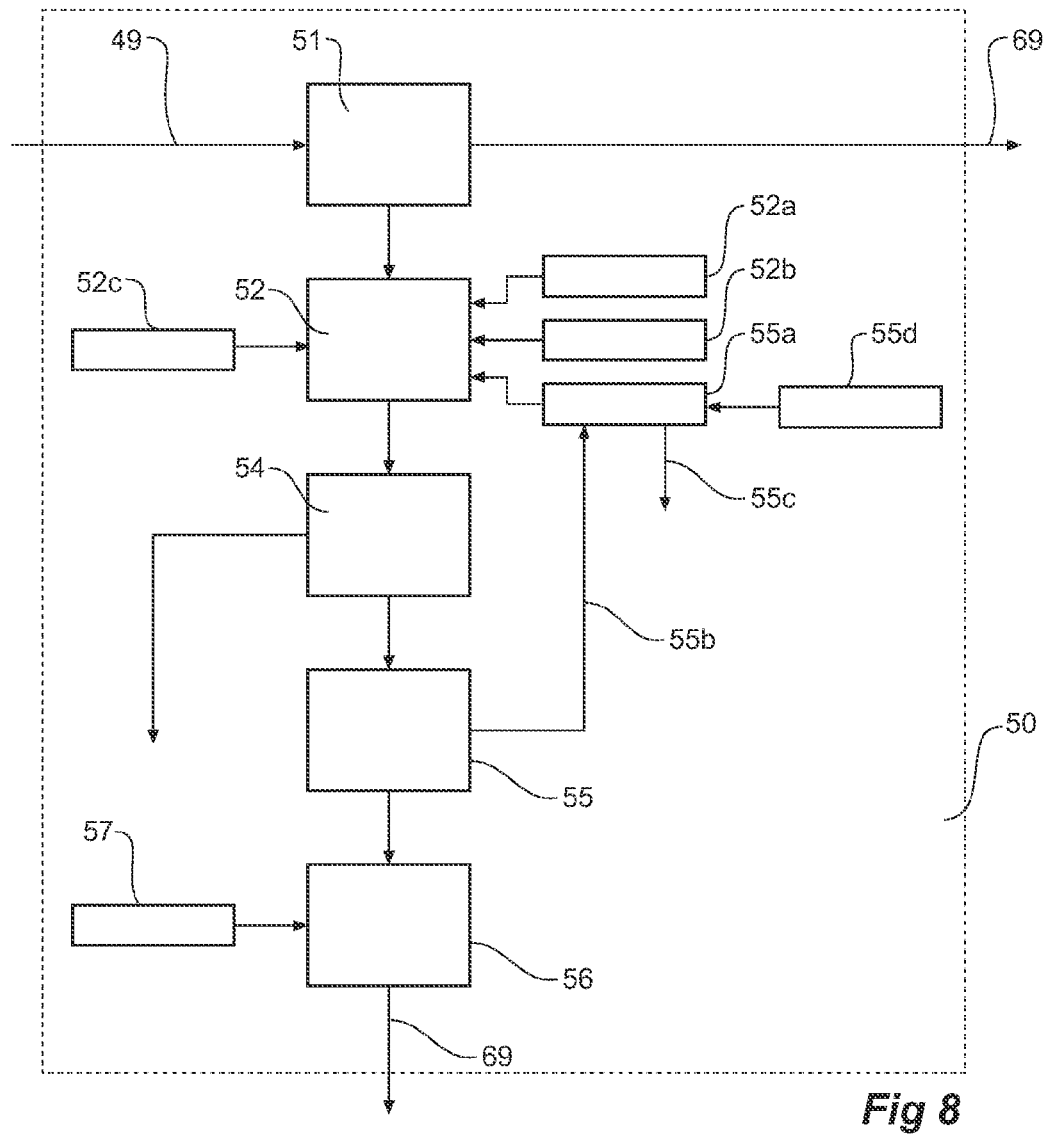
FIG. 8 illustrates a more detailed flow diagram of the ion exchange part of the process of one or more embodiments.

One option for the uranium extraction stage 50 is shown in FIG. 8. The purpose of this unit process is to extract uranium from the treated WPA stream to produce a concentrated uranium solution suitable for refining.

Valency reduced WPA 49 from the valency reduction process 40 is transferred to the ion exchange (IX) columns 51 containing a chelating ion exchange resin. Each train of IX columns will nominally have one lead column, one catch (or tail) column and one column in elution/idle mode at any one time. The treated, uranium-depleted WPA 69 is returned to the WPA holding tanks 25 (see FIG. 6) to be used for fertilizer production, etc.

Once a column 51 is loaded it is taken offline and eluted. The elution procedure 52 includes:
  A process water rinse 52a;
  A rinse with ammonia solution 52b; and
  Elution with three Bed Volumes (BV) of ammonium carbonate solution 55a.

Uranium forms a stable, soluble uranyl tricarbonate complex in the ammonium carbonate solution, whereas impurities such as iron will form insoluble compounds. Precipitated iron can be removed from the eluate using filters 54 prior to entering secondary IX where further rejection of impurities takes place. Eluate from the primary IX 51, containing uranyl carbonate is passed to a secondary anionic ion exchange 55, to extract the uranium onto the resin, and to recycle the ammonium carbonate 55b. A nominal 10% bleed 55c, is removed to control impurity build up in the eluant and is replaced with fresh ammonium carbonate solution 55d.

The secondary IX 55 may be eluted 56 with 1M sodium carbonate solution 57 to produce a concentrated uranyl solution 69.

Figure 9:
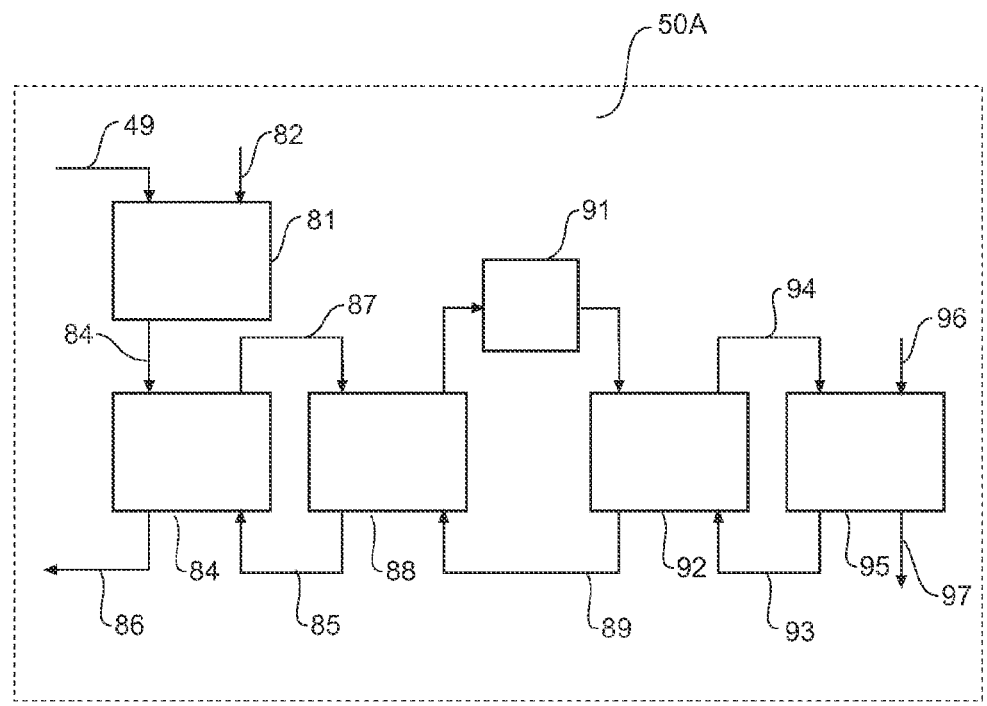
FIG. 9 illustrates an alternative system for extraction of uranium from treated WPA.

An alternative option for the uranium extraction stage is shown in FIG. 9. Treated WPA 39 from the iron reduction stage 30 enters the uranium extraction process stage 50A into an oxidation stage 81 in which the WPA is further oxidized preferably using air/oxygen mixture 82, but may involve the use of chemical oxidants, such as hydrogen peroxide. The oxidized WPA is then transferred 83 to a solvent extractor 84.

In one embodiment the extraction can take place utilizing a multi-extraction DEHPA TOPO (di-2-ethylhexyl phosphoric acid and trioctylphosphine oxide) system 85, nominally with a concentration of 0.5M DEHPA and 0.125M TOPO in a kerosene based organic diluent, operated at around 60 degrees C. Uranium depleted WPA 86 is returned to the WPA holding tanks 25 (see FIG. 6) to be used for fertilizer production, and the like.

In one embodiment the stripping 88 of the pregnant organic phase 87 takes place using reduced WPA 89, to give a concentrated, but impure, WPA stream 88. This stream is preferably re-oxidized 91 and re-contacted 92 with a multi-extraction DEHPA TOPO SX system 93. The second stage SX liquor 94 is preferably stripped 95 with ammonium carbonate 96 to form a uranyl carbonate solution 97.

In another alternative the solvent extraction (SX) process for the extraction of the uranium from the iron reduced, valency reduced WPA stream takes place utilizing a multi-extraction OPAP (a 1:1 mixture of mono and di octylphenyl phosphoric acid) system, nominally with a concentration of 0.3M in a kerosene based organic diluent, operated at around 60 degrees C.

The stripping of the organic phase takes place using oxidized WPA, to give a concentrated, but impure, WPA stream. This stream is preferably re-oxidized and re-contacted with a multi-extraction DEHPA TOPO (di-2-ethylhexyl phosphoric acid and trioctylphosphine oxide) SX system. The second stage SX is preferably stripped with ammonium carbonate to form a uranyl carbonate.

Figure 10:
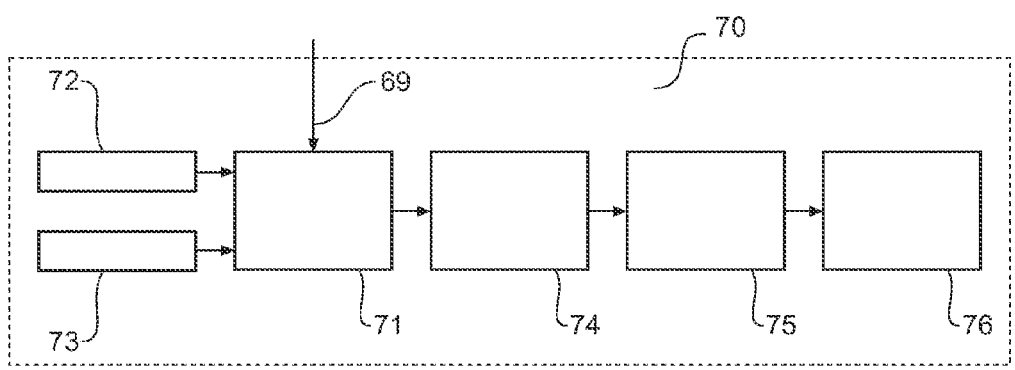
FIG. 10 illustrates a more detailed flow diagram of the uranium oxide concentration part of the process of one or more embodiments.

The purpose of the uranium oxide concentrate (UOC) production stage 70 as shown in FIG. 10 is to produce and package UOC that meets converter product specifications. The step of precipitating the uranium from the concentrated uranyl solution 69 comprises acidification and removal of carbon dioxide generated, formation of a uranyl peroxide through the addition of hydrogen peroxide as well as caustic soda as required to maintain a suitable pH for the precipitation reaction. The step of drying the precipitated product involves thickening the precipitate in a high rate thickener and drying in a low temperature dryer at 260° C.

The concentrated uranyl solution 69 is pumped into the first of three tanks in series 71. Hydrogen peroxide 72 and caustic soda 73 is added to enable precipitate uranium of oxides. The total residence time in the precipitation reactors is three hours. The underflow is transferred to a thickener 74, followed by drying 75 of the precipitate at around 260° C. and subsequent drumming 76 into drums and finally packaging into shipping containers.

Figure 11:
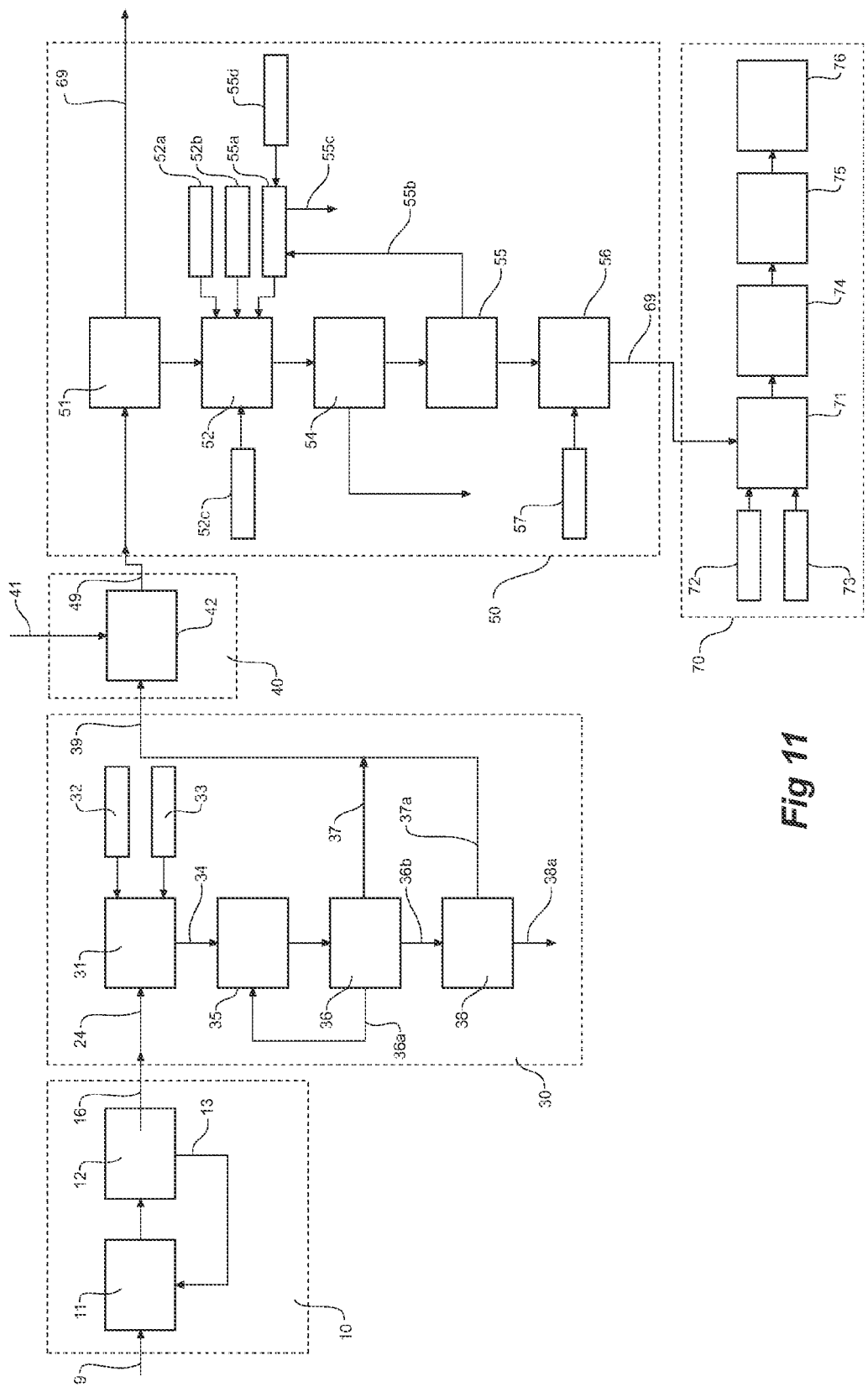
FIG. 11 illustrates a flow diagram for another embodiment of the invention.

FIG. 11 illustrates a complete flow sheet for a preferred embodiment of the invention.

In the clarification stage 10 the WPA is cleaned. Plant feed 9, at a concentration of approximately 30% WPA is likely to contain a significant amount of suspended solids, mostly sodium fluorosilicates and gypsum, which may cause issues for later stages of the process. In the clarification stage 10 there may be an existing clarifier 11 in a WPA plant and additional clarifiers 12, complementing the pre-existing clarifiers, are used to reduce the total suspended solids (TSS) and decrease process fluctuations due to upstream changes. One such fluctuation may result from regular maintenance activities on the existing clarification circuit. In this embodiment, WPA can, for instance, be clarified in conventional clarifiers. The clarifiers are dosed with flocculant to encourage precipitation of suspended solids. Underflow from the clarifier 12 is transferred back to the clarifier 11 with the overflow 16 from the additional clarifier 12 being transferred to the iron removal stage of the process.

In the iron removal stage 30 the aim is to lower the iron content. The mechanism of this embodiment of the invention is to remove the majority of the total iron present through precipitation of an iron ammonium phosphate (IAP) compound.

The ion exchange (IX) resin proposed for the extraction of uranium has a high affinity to load ferric iron, which inhibits uranium loading; hence, if IX is to be used effectively the iron in WPA solution reporting to IX must be presented in the ferrous state. The IAP precipitation section of the plant was designed to remove a portion of the ferric iron, as a partial step prior to reporting to the valency reduction (VR) circuit.

Additionally IAP precipitation reduces scaling species (fluorosilicate and gypsum) in the iron reduced WPA reporting to the IX circuit, dramatically improving operability of the fixed bed IX operation. IAP is formed by the following reactions:

$$H_3PO_4 + H_2O \rightarrow H_2PO_4^- + H_3O^+$$

$$H_2PO_4^- + H_2O \rightarrow HPO_4^{--} + H_3O^+$$

$$NH_4^- + 3Fe^{3+} + 2H_2PO_4^- + 4HPO_4^{--} + 4H_2O \rightarrow Fe_3(NH_4)H_8(PO_4)_6 \cdot 4H_2O$$

WPA 19 is transferred to a small pre-mix tank 31, where one or more of air, oxygen or peroxide 32 can be added in sufficient quantities to increase the redox potential of retentate 24 to approximately 500 mV (ensuring complete oxidation of ferrous to ferric iron). Alternatively, no oxidant may be added. Ammonia 33 is also added at this point at a stoichiometric excess of approximately 300-1000% of the calculated ammonia requirements for formation of IAP. From the pre-mix tank 31, the treated WPA 34 is transferred to overflow reactors 35. The treated WPA 34 has a total residence time of 7 to 12 hours in the overflow reactors 35 to allow completion of the IAP precipitation process. The overflow from the overflow reactor 35 is transferred to a centrifuge, or other solid liquid separation device 36, where IAP is separated from the WPA. The clarified liquor 37 (low solid concentration) is transferred to the iron valency reduction stage 40. The majority of the solids discharged from the centrifuge 36 are returned via line 36a to the overflow reactors 35 to maintain a solids density of 15-35 wt. % in the reactor.

The remaining solids 36b discharged from the centrifuge 36 are transferred to a belt filter 38 where additional clarified liquor is removed from the cake and forwarded to valency reduction via line 37a. Solids 38a comprising mostly IAP are removed.

The purpose of the valency reduction stage 40 is to ensure that all of the iron presented to the ion exchange stage is reduced to ferrous iron as ferric iron loads preferentially to uranium on the ion exchange resin reducing potential uranium loading.

Metallic iron 41 is be added to reactor 42 in order to reduce the remainder of the ferric iron to ferrous iron. This can add an additional load of dissolved iron impurity to the entire process. For example, concentrate may be pumped into three agitated tanks with a total residence time of three hours. Powdered or granular iron is added into the first of two reactors at 120% stoichiometric equivalent (relative to the amount of ferric iron). The reaction with the ferric iron is:

$$Fe_{(metal)} + 2Fe^{3+} \rightarrow 3Fe^{2+}$$

The uranium extraction stage 50 is next. The purpose of this unit process is to extract uranium from the treated WPA stream to produce a concentrated uranium solution suitable for refining.

Reduced WPA 49 from the valency reduction process 40 is transferred to the ion exchange (IX) columns 51 containing a chelating ion exchange resin. Each train of IX columns will nominally have one lead column, one catch (or tail) column and one column in elution/idle mode at any one time. The treated, uranium-depleted WPA 69 is returned to the WPA holding tanks 25 (see FIG. 6) to be used for fertilizer production, etc.

Once a column 51 is loaded it is taken offline and eluted. The elution procedure 52 includes:

A process water rinse 52a;

A rinse with ammonia solution 52b; and

Elution with three Bed Volumes (BV) of ammonium carbonate solution 55a. Uranium forms a stable, soluble uranyl tricarbonate complex in the ammonium carbonate solution, whereas impurities such as iron will form insoluble compounds. Precipitated iron can be removed from the eluate using filters 54 prior to entering secondary IX where further concentration of uranium and rejection of impurities takes place. Eluate from the primary IX 51, containing uranyl carbonate is passed to a secondary anionic ion exchange 55, to extract the uranium onto the resin, and to recycle the ammonium carbonate 55b. A nominal 10% bleed 55c, is removed to control impurity build up in the eluant and is replaced with fresh ammonium carbonate solution 55d.

The secondary IX 55 may be eluted 56 with 1M sodium carbonate solution 57 to produce a concentrated uranyl solution 69.

The purpose of the next stage, the uranium oxide concentrate (UOC) production stage 70, is to produce and package UOC that meets converter product specifications. The step of precipitating the uranium from the concentrated uranyl solution 69 comprises acidification and removal of carbon dioxide generated, formation of a uranyl peroxide through the addition of hydrogen peroxide as well as caustic soda as required to maintain a suitable pH for the precipitation reaction. The step of drying the precipitated product involves thickening the precipitate in a high rate thickener and drying in a low temperature dryer at 260° C.

The concentrated uranyl solution 69 is pumped into the first of three tanks in series 71. Hydrogen peroxide 72 and caustic soda 73 is added to enable precipitate uranium of oxides. The total residence time in the precipitation reactors is three hours. The underflow is transferred to a thickener 74, followed by drying 75 of the precipitate at around 260° C. and subsequent drumming 76 into drums and finally packaging into shipping containers.

Many modifications and other embodiments of the invention will come to the mind of one skilled in the art having the benefit of the teachings presented in the foregoing descriptions and associated drawings. Therefore, it is understood that the invention is not to be limited to the specific embodiments disclosed, and that modifications and embodiments are intended to be included within the scope of the appended claims.

That which is claimed is:

1. A process for the extraction of uranium compounds from wet-process phosphoric acid (WPA), the process comprising:

lowering iron content of the WPA to produce a lowered iron WPA;

adding a reducing agent to the lowered iron WPA for reducing valency of any remaining iron in the lowered iron WPA to produce a reduced iron valency WPA; and extracting uranium compounds from the reduced iron valency WPA.

2. The process of claim 1, further comprising:
separating from the lowered iron WPA a side stream having a greater concentration of the uranium compounds than the WPA by passing the lowered iron WPA through a filter membrane to produce a clean WPA permeate and a retentate as the side stream, the retentate comprising a greater concentration of the uranium compounds than the concentration of uranium in the permeate.

3. The process of claim 2, wherein the filter membrane is selected from an ultra-filtration or a nano-filtration membrane or combination thereof and comprising a pore size in the range of from 10 to 1,000 Å.

4. The process of claim 1, wherein lowering iron content of the WPA comprises precipitating the iron as an iron ammonium phosphate.

5. The process of claim 4, wherein precipitating the iron as an iron ammonium phosphate compound comprises adding ammonia, forming a precipitate, and separating the precipitate from the WPA.

6. The process of claim 1, wherein reducing valency of iron in the WPA comprises reducing ferric iron to ferrous iron.

7. The process of claim 6, wherein reducing the ferric iron to ferrous iron comprises contacting the WPA with a compound selected from one or more of the group consisting of: a ferro-phosphorous compound, a ferro-silicon compound, and metallic iron.

8. A process for extracting uranium species from wet-process phosphoric acid (WPA), the process comprising:
(a) decreasing the concentration of dissolved iron species in the WPA relative to the concentration of uranium species in the WPA to produce a decreased iron content WPA having uranium species therein;
(b) subjecting the decreased iron content WPA to a reduction step, wherein the valency of dissolved iron species remaining in the decreased iron content WPA is reduced; and
(c) extracting the uranium species from the decreased iron content WPA subsequent to the reduction step.

9. The process of claim 8, further comprising:
separating from the decreased iron content WPA a side stream having a greater concentration of the uranium species than the WPA by passing the decreased iron content WPA through a filter membrane to produce a clean WPA permeate and a retentate as the side stream, the retentate comprising a greater concentration of the uranium species than the concentration of uranium in the permeate.

10. The process of claim 9, wherein the filter membrane is selected from an ultra-filtration or a nano-filtration membrane or combination thereof and comprising a pore size in the range of from 10 to 1,000 Å.

11. The process of claim 8, wherein decreasing the concentration of dissolved iron species in the WPA relative to the concentration of uranium species in the WPA comprises precipitating dissolved iron species as iron ammonium phosphate.

12. The process of claim 11, wherein precipitating dissolved iron species as iron ammonium phosphate comprises adding ammonia, forming a precipitate, and separating the precipitate from the WPA.

13. The process of claim 8, wherein the reduction step comprises reducing ferric iron to ferrous iron.

14. The process of claim 13, wherein reducing the ferric iron to ferrous iron comprises contacting the WPA with a compound selected from the group consisting of: a ferro-phosphorous compound, a ferro-silicon compound, metallic iron, and a combination thereof.

15. A process for the extraction of uranium compounds from wet-process phosphoric acid (WPA), the process comprising:
(a) receiving a stream of raw WPA comprising uranium species, dissolved iron species, and suspended solids;
(b) passing the stream of raw WPA through a clarifier to remove suspended solids by flocculation, thereby creating a clarified WPA stream;
(c) filtering the clarified WPA stream to produce a retentate stream and a permeate stream, wherein the concentration of uranium species in the retentate stream is greater that the concentration of uranium species in the raw WPA;
(d) separating the permeate stream from the retentate stream;
(e) precipitating dissolved iron species from the retentate stream as iron ammonium phosphate by reacting the retentate stream with ammonia to form a lowered iron content retentate and a precipitant;
(f) removing the precipitant from the lowered iron content rententate by centrifugation;
(g) transferring the lowered iron content retentate to a reduction stage after centrifugation, wherein the lowered iron content retentate is treated to reduce the valency of any non-precipitated ferric iron in the lowered iron content retentate;
(h) lowering the concentration of uranium species in the lowered iron content retentate after the reduction stage by collecting uranium species in the lowered iron content retentate;
(i) forming a uranyl solution from the collected uranium species; and
(j) precipitating uranium oxide from the uranyl solution.

16. The process of claim 15, wherein collecting uranium species comprises passing the lowered iron content retentate over a chelating ion exchange resin, wherein uranium species bind to the chelating ion exchange resin.

17. The process of claim 16, wherein forming a uranyl solution comprises eluting with ammonium carbonate solution to form uranyl carbonate.

18. The process of claim 15, wherein collecting uranium species comprises oxidizing the lowered iron content retentate after the reduction stage and subsequently extracting uranium via solvent extraction.

19. The process of claim 18, wherein forming a uranyl solution comprises mixing a solvent used in solvent extraction with ammonium carbonate solution to form uranyl carbonate.

* * * * *